United States Patent [19]
Bishop et al.

[11] Patent Number: 5,815,616
[45] Date of Patent: Sep. 29, 1998

[54] OPTICAL PACKAGING ASSEMBLY FOR REFLECTIVE DEVICES

[75] Inventors: David J. Bishop, Summit; Joseph E. Ford, Oakhurst; William M. MacDonald, Lebanon; Rene R. Ruel, Bridgewater; James A. Walker, Howell, all of N.J.

[73] Assignee: Lucent Technologies Inc., Murray Hill, N.J.

[21] Appl. No.: 778,119

[22] Filed: Jan. 2, 1997

[51] Int. Cl.$^6$ .................................................. G02B 6/26
[52] U.S. Cl. ............................................................ 385/52
[58] Field of Search .............................. 385/88, 90, 92, 385/76, 77, 93; 359/152, 195

[56] References Cited

U.S. PATENT DOCUMENTS

| | | | |
|---|---|---|---|
| 5,179,609 | 1/1993 | Blonder et al. | 385/89 |
| 5,257,336 | 10/1993 | Dautartas | 385/93 |
| 5,259,054 | 11/1993 | Benzoni et al. | 385/89 |
| 5,276,756 | 1/1994 | Chambers et al. | 385/90 |
| 5,337,391 | 8/1994 | Lebby | 385/88 |
| 5,631,987 | 5/1997 | Lasky et al. | 385/88 |

*Primary Examiner*—Akm E. Ullah

[57] ABSTRACT

Packaging for a reflective optical device, methods for manufacturing the packaging, and use of the packaging in an optical communications system are disclosed. The optical package assembly includes an optical package and an optical package subassembly. The optical package receives the optical subassembly, which includes a packaging component attached to a reflective optical device. An end of the optical package receives a optical fiber that is delivered to a fiber alignment region in the packaging component that is in optical communication with the reflective optical device.

37 Claims, 6 Drawing Sheets

OPTICAL PACKAGING ASSEMBLY FOR REFLECTIVE DEVICES

STATEMENT OF THE RELATED CASES

This specification is related to copending specification Attorney Docket No. Bishop 3-13-12-2-38, entitled OPTICAL PACKAGING ASSEMBLY FOR TRANSMISSIVE DEVICES, filed on even date herewith.

FIELD OF THE INVENTION

The present invention relates to packaging reflective devices for use in optical systems.

BACKGROUND OF THE INVENTION

Network architectures for two-way optical fiber communications to the home have been proposed. One such architecture is based on a wavelength-division-multiplexed (WDM) network using optical modulators, rather than expensive wavelength-stabilized sources, at each home. The optical modulators are powered by a shared laser source at a central office.

A surface normal optical modulator operating in a reflection mode ("reflective modulators") may be used in such a network. Reflective modulators operate by reflecting, or not reflecting, an optical signal. An optical fiber receives the reflected signal and delivers it to a wavelength router for routing to a receiver in a central office.

For such a network to be cost effective, the modulator must be a low cost component. As with most single mode components, the cost of packaging such modulators is perhaps the dominant cost factor. Thus, there is a need for low cost packaging for a reflective optical modulator.

SUMMARY OF THE INVENTION

Packaging for a reflective optical device, methods for manufacturing the packaging, and use of the packaging in an optical communications system, are disclosed. An optical package assembly according to the present invention comprises an optical package and an optical packaging subassembly. In a first exemplary embodiment, the optical package is a fiber ferrule and the optical package subassembly comprises a packaging component attached to a reflective optical device. The optical package subassembly is abutted to an end of the fiber ferrule.

The packaging component has a fiber alignment region for receiving an optical fiber delivered to it through a bore in the fiber ferrule. The fiber alignment region optically aligns the optical fiber to a window in the packaging component which is in optical communication with the reflective optical device. In this manner, the reflective optical device can be incorporated into a fiber-optic system.

In a second exemplary embodiment of an optical package assembly according to the present invention, the optical package is a slotted ferrule sleeve and the optical subassembly includes a centering disk in addition to the packaging component and the reflective optical device. As in the first embodiment, the optical package subassembly is received by the slotted ferrule sleeve. The slotted ferrule sleeve also receives a ferrule through which an optical fiber is delivered to the optical package subassembly. The packaging component receives the optical fiber in a fiber alignment region as in the first exemplary embodiment.

In an exemplary embodiment of the optical subassembly, the reflective optical device can be a reflective modulator residing on a modulator chip. In operation, the optical fiber delivers an optical signal to the modulator, which has a membrane suspended over a substrate forming a gap therebetween. As a voltage from a controlled voltage source is applied across the membrane and substrate, an electrostatic force is generated causing the membrane to move towards the substrate. As it does so, the gap changes in size, resulting in a change in modulator reflectivity. By controlling the change in modulator reflectivity, information can be encoded on the optical signal. The information-encoded optical signal reflected by the modulator is received by the optical fiber.

According to a first method, the packaging component is attached to the modulator chip by first forming a metallized ring-shaped textured region on a surface of the packaging component. A metallic or metallized ridge is also formed on a surface of the modulator chip. The textured region and the metallic ridge are aligned and bonded, thereby attaching the packaging component to the modulator chip.

The first attachment method advantageously forms a hermetic seal around the modulator. The hermetic seal protects the modulator from environmental influences and also facilitates using gases other than air at pressures other than atmospheric within the gap. Also, the ring-shaped regions provide optical alignment of the modulator to the window in the packaging component.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION

Figure 1:
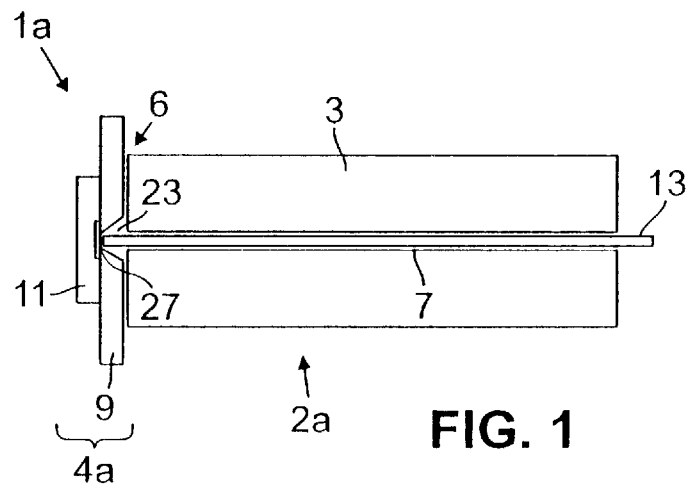
FIG. 1 is a top cross-sectional view of a first illustrative embodiment of an optical package assembly according to the present invention.

FIG. 1 shows a top cross-sectional view of an exemplary first embodiment of an optical package assembly (OPA) 1a for a reflective optical device. A wide variety of reflective devices 11 can used in the OPA 1a including, without limitation, a reflective amplitude modulator, a reflective phase modulator, a reflective modulator used in analog fashion as a variable attenuator, a polarization rotator, a polarizer, and a wavelength filter.

For the purposes of illustration, the reflective optical device 11 will be assumed to be a reflective amplitude modulator. For clarity of description, the reflective modulator will be given the reference numeral "11." It should be understood that other reflective devices, including those mentioned above, could be substituted for the modulator in the following description. Use of such other devices in conjunction with the OPA 1a may require modifications or adaptations that are within the capabilities of skilled artisans.

The OPA 1a consists of an optical package (OP) 2a and an optical package subassembly (OSA) 4a. In the OPA 1a, the OP 2a is a ferrule 3. In the OPA 1a, the OSA 4a includes a packaging component 9 and a reflective device 11, which, for the purposes of illustration, is a modulator chip. FIG. I shows the OSA 1a abutted to an end 6 of the ferrule 3 that delivers an optical fiber 13 to the OSA 4a.

Figure 2:
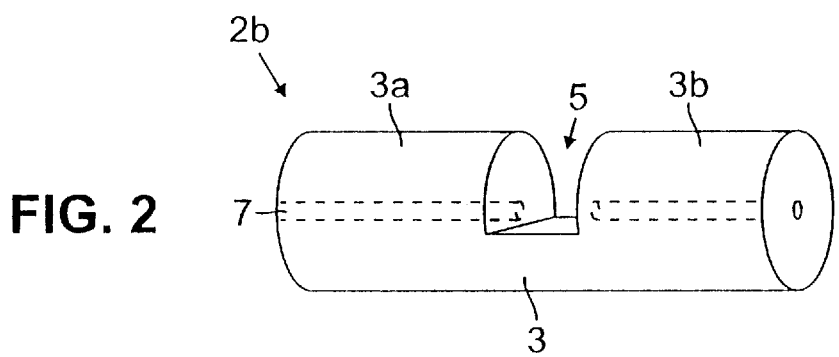
FIG. 2 is a perspective view of an illustrative embodiment of a slotted ferrule used for receiving an optical package subassembly in an alternate embodiment.

In an alternative embodiment, an OPA 1b consists of an OP 2b and the OSA 4a. The OP 2b is a ferrule 3 having an opening or slot 5 therein, as shown in perspective view in FIG. 2. In the OPA 1b, the OSA 4a can be received by the opening or slot 5. Such an arrangement is disclosed in a copending patent application entitled OPTICAL PACKAGING ASSEMBLY FOR TRANSMISSIVE DEVICES, attorney docket no. Bishop 3-13-12-2-38, filed on even date herewith as Ser. No. 08/775,910 now is pending. That patent application, and all other patent applications and patents referenced in this specification are incorporated herein by reference in their entirety. It will be appreciated that if an OPA according to the present invention is used in conjunction with a slotted ferrule, such as in the OPA 1b, only a single optical fiber and fiber alignment region are required. For transmissive optical devices, as disclosed in the above-referenced specification, two fibers and two fiber alignment regions are required.

With continuing reference to FIG. 1, the ferrule 3 has a bore 7 formed axially therethough for receiving the optical fiber 13. The fiber 13 enters a fiber alignment region 23 in the packaging component 9 and terminates at a window 27.

Figure 3:
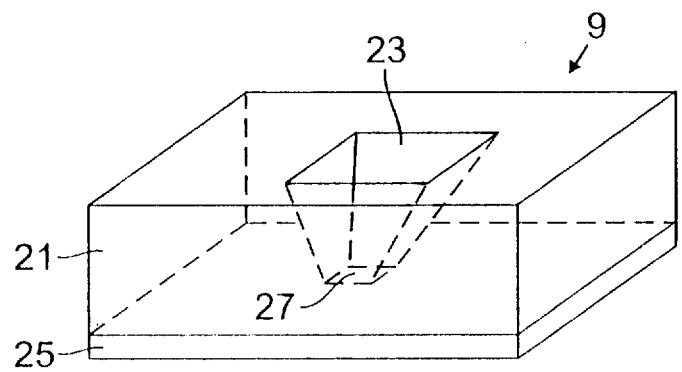
FIG. 3 is a perspective view of an illustrative embodiment of a packaging component according to the present invention used in the optical package subassembly.

A perspective view of the packaging component 9 is provided in FIG. 3. The packaging component comprises a substrate region 21 and a window layer 25. In preferred embodiments, such as the one illustrated in FIG. 3, the fiber alignment region 23 is formed by a crystallographic etch. As shown, the fiber alignment region 23 tapers inwardly along a crystallographic etch plane in the substrate region 21 terminating at a window 27 at the window layer 25. The size of the fiber alignment region 23 at the window 27 should be sized for the diameter of the input fiber 13 to mechanically align the input fiber 13 to the window 27.

In such embodiments, the substrate region 21 must be formed from a material suitable for such crystallographic etching. Suitable materials include, without limitation, silicon, gallium arsenide, indium phosphide and germanium. It should be understood that in other embodiments, the fiber alignment region need not be formed by a crystallographic etch or have a taper as shown in FIG. 3.

The window layer 25 should be optically transparent at the operating wavelengths of the modulator chip. Furthermore, the window layer 25 should be formed of a material that etches at a much slower rate than the substrate region 21, thereby functioning as a etch-stop for the crystallographic etch that forms the fiber alignment region 23 in preferred embodiments. Suitable materials for the window layer 25 include, without limitation, high pressure steam oxide (HiPOx), thermal oxide and silicon nitride. In presently preferred embodiments, the window layer is HiPOx having a thickness in the range of about 5 to 15 microns.

Figure 4:
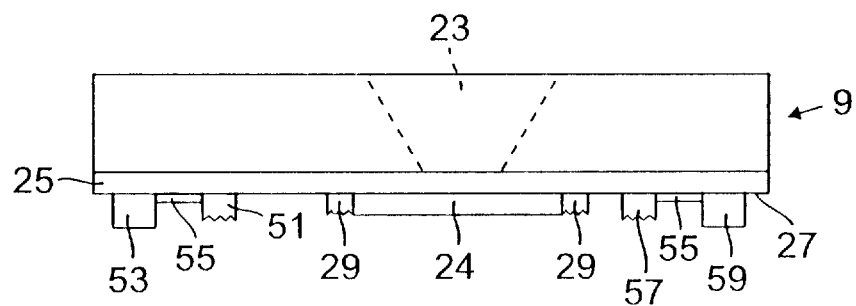
FIG. 4 is a cross-sectional view of the packaging component of FIG. 3 showing additional features.

FIG. 4 illustrates further features of the packaging component 9 that are used to attach the packaging component to the modulator chip 11 in preferred embodiments. In particular, the surface 27 of the window layer 25 includes a raised or textured region 29. The textured region 29 is ring-shaped, and is metallized to facilitate bonding with the modulator chip 11, as described in more detail later in this specification.

Additionally, discrete textured regions or solder bumps 51, 57 are disposed on the surface 27 outside the region enclosed by the textured region 29. The region 51 is in electrical connection with a wire bond pad 53 via a runner 55, and the region 57 is in electrical contact with a wire bond pad 59. Wires, not shown, bonded to the bond pads 53, 59 and in electrical connection with a controlled voltage source, deliver a voltage across the modulator as appropriate when the packaging component 9 is bonded thereto as described further below.

Figure 5A:
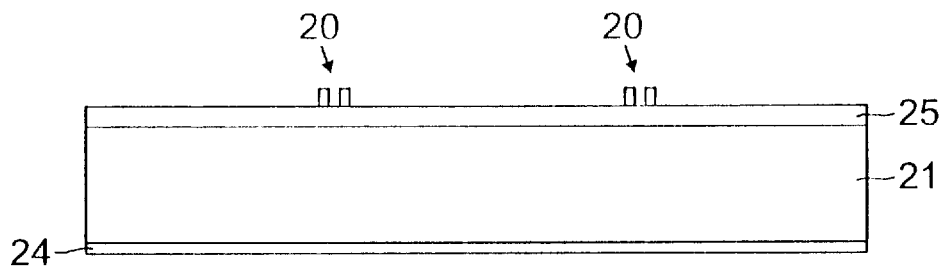
FIGS. 5a–5d illustrate a method for making the packaging component by way of showing the packaging component in various stages of completion.
Figure 5B:
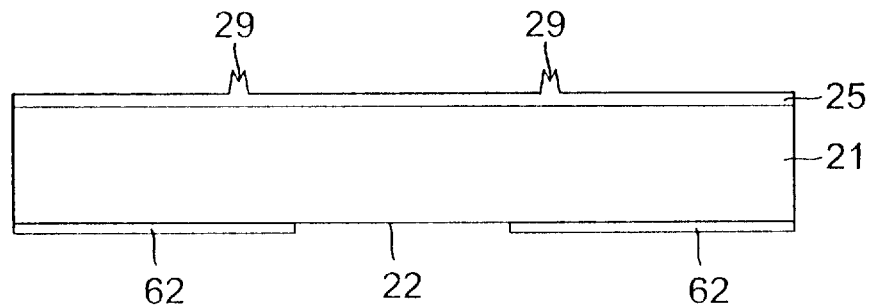
Figure 5C:
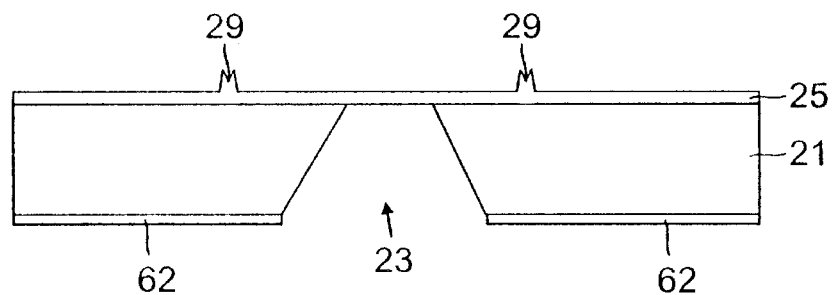
Figure 5D:
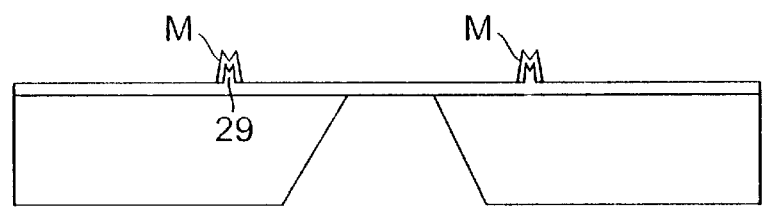

An exemplary embodiment of a method for forming the fiber alignment region 23 and textured region 29 is illustrated in FIGS. 5a–5d. Photolithographic techniques are used. FIG. 5a shows the window layer 25 and substrate region 21. A ring-shaped mask 20 is disposed on the window layer 25 and a layer of polysilicon 24 is disposed on the substrate region 21. The raised ring-shaped region 29 is patterned in the window layer 25 and an etch mask 62 is patterned in the polysilicon layer 24 on the substrate region 21. Preferably, the raised region 29 and the etch mask 62 are simultaneously patterned with a double-sided mask aligner. FIG. 5b shows the textured region 29 and the etch mask 62. Etchant is applied, etching the substrate region 21 from the surface 22 along a crystallographic etch plane and terminating at the window layer 25. FIG. 5c shows the fiber alignment region 23 etched in the substrate region 21. An anti-reflection coating is then optionally deposited on window layer 25. Metal M is then deposited on the textured region and the appropriate wire bond pads 53, 59 and runners 55 are formed. The metallized textured region is shown in FIG. 5d.

Figure 6:
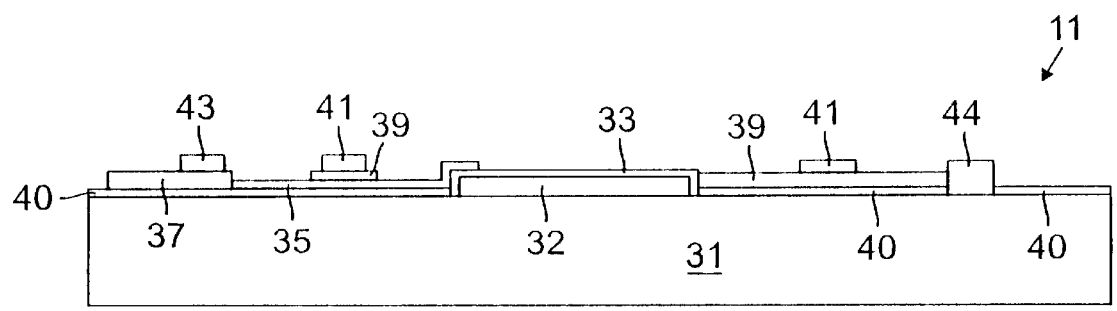
FIG. 6 is an illustrative embodiment of a reflective optical device for use in the present invention.

An exemplary embodiment of the modulator chip 11 is shown in FIG. 6. The chip 11 includes a membrane 33 that is suspended above a substrate 31, defining a gap 32. Modulator configurations suitable for use in conjunction with the present invention include surface normal micromechanical optical modulators. Preferred modulators include those disclosed in U.S. Pat. No. 5,500,761, and U.S. patent applications Ser. No. 08/283,106 filed Jul. 29, 1994, Ser. No. 08/578,590 filed Jun. 7, 1995, Ser. No. 08/479,476 filed Jun. 7, 1995, Ser. No. 08/578,123 filed Dec. 26, 1995, Ser. No. 08/565,453 filed Feb. 1, 1996, and Ser. No. 08/597,003 filed Feb. 5, 1996. In particularly preferred embodiments, the modulator membrane is comprised of at least one layer having a refractive index that is approximately equal to the square root of the refractive index of the substrate and has a thickness of one-quarter of a wavelength of the optical signal being modulated, as measured in the layer. It should be understood that other types of micromechanical modulators, such as classic Fabry-Perot devices, and semiconductor modulators can be used in conjunction with the present invention.

Figure 7:
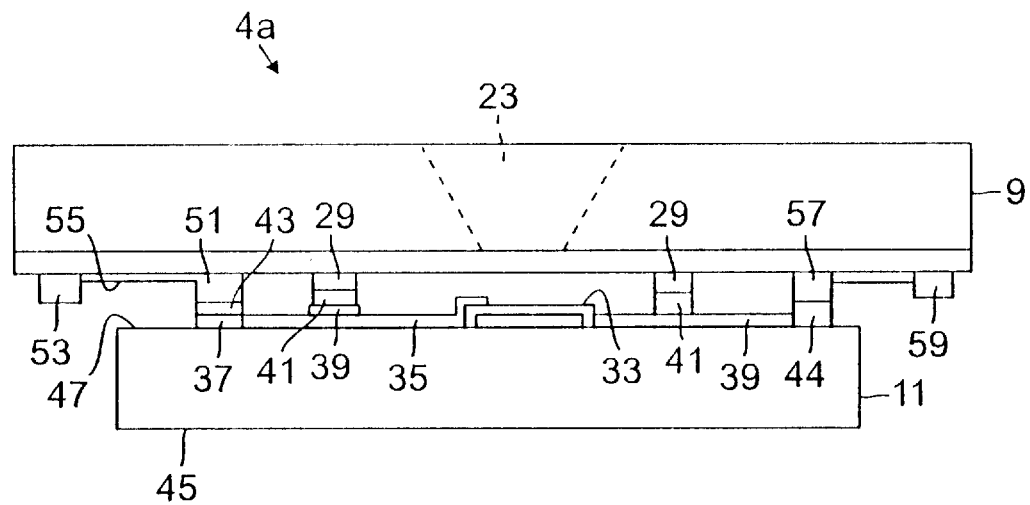
FIG. 7 shows the packaging component of FIG. 4 attached to the reflective optical device of FIG. 6.

A layer 40 of material is disposed on the substrate 31 except in the region beneath the membrane 33. The layer 40, which can be silicon nitride, silicon oxide or phosphoro silicate glass (PSG), for example, may be deposited during formation of the modulator structure. Its relevance here is that it provides electrical insulation between the substrate 31 and an electrical runner 35 and wire bond pad 37 that are deposited on the layer 40. The electrical runner provides electrical connection between the membrane 33 and the contact or wire bond pad 37. An insulating region 39, formed of material such as, without limitation, silicon oxide or silicon nitride, is disposed on the electrical runner 35. A bump 43 of solder or the like is disposed on the wire bond pad 37. The solder bump 43 is located so that when the modulator chip 11 is attached to the packaging component 9, as shown in FIG. 7, the solder bump aligns with and bonds to the textured region 51 on the packaging component 9. The modulator membrane 33 is thereby placed in electrical contact with the bond pad 53 on the packaging component 9.

If the modulator is formed using a method wherein the layer 40 is not present on the substrate 31, then provisions should be made to electrically isolate the electrical runner 3 5 and wire bond pad 37 from the substrate 31 to prevent shorting.

With continuing reference to FIG. 6, a bump 44 of solder or other suitable material is disposed on the substrate 31. The insulating layer 39 is disposed on the substrate 31 (or the layer 40) leading to the bump 44. The insulating layer 39 is not required for the purpose of electrical isolation since electrical contact via the bump 44 is to the substrate 31, not the membrane 33. Providing the insulating layer 39 in that region aids in achieving a consistent height for a ring-shaped ridge 41 of solder or the like disposed thereon. The bump 44 is located so that it aligns and bonds with the textured region 55. The modulator substrate 31 is thereby placed in electrical contact with bond pad 59 on the packaging component 9.

The aforedescribed arrangement of solder bumps and bond pads and electrical runners advantageously transfers electrical contact with the controlled voltage source from the modulator chip 11 to the packaging component 9. Such transfer protects the modulator from damage. Other configurations capable of transferring electrical contact as described above can suitably be used.

The packaging component 9 and the modulator chip 11 are bonded at the metallized ring-shaped textured region 29 and the ring-shaped ridge 41. As described above, bonding also occurs between textured regions 51, 57 and bumps 43, 44, respectively. Conventional solder bonding can be used. In preferred embodiments, textured compression bonding, as described in U.S. Pat. No. 5,291,572, is used. Once bonded, as shown in FIG. 7, the textured region 29 forms a hermetic seal around the modulator's membrane 33. The membrane 33 is positioned so that when bonded, it is aligned with the window 27 in the packaging component 9.

The bonding operating thus advantageously fixes the alignment between the packaging component 9 and the modulator's membrane 31, transfers the electrical contact from the modulator chip 11 to the packaging component 9, and provides a hermetic seal around the modulator.

In operation, an optical signal is carried by the fiber 13 to the window 27 in the packaging component 9. The signal passes through the window 27 and is received by the modulator membrane 33. To encode information onto the signal, a voltage is delivered across the membrane 33 and substrate 31 from a controlled voltage source. As the voltage is applied, the membrane moves toward the substrate resulting in a change in the size of the gap 32. Changing the size of the gap 32 results in a change in the reflectivity of the modulator. The pattern of variations in the optical energy reflected to the fiber 13 resulting from the controlled change in reflectivity provides information content, i.e., modulates the signal.

Figure 8:
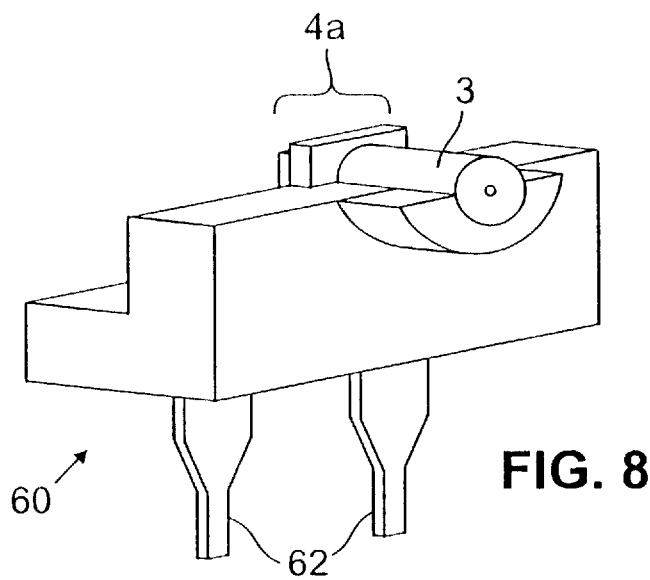
FIG. 8 is an exemplary embodiment of a packaging base for use in conjunction with the present invention.

An illustrative embodiment of a packaging base 60 for receiving the OPA 1a is shown in FIG. 8. In preferred embodiments, the base 60 is formed from molded plastic. Pins 62 provide electrical contact to off-chip electronics, not shown. A lid, not shown, is preferably included to protect the OSA 4a from environmental influences.

Figure 9:
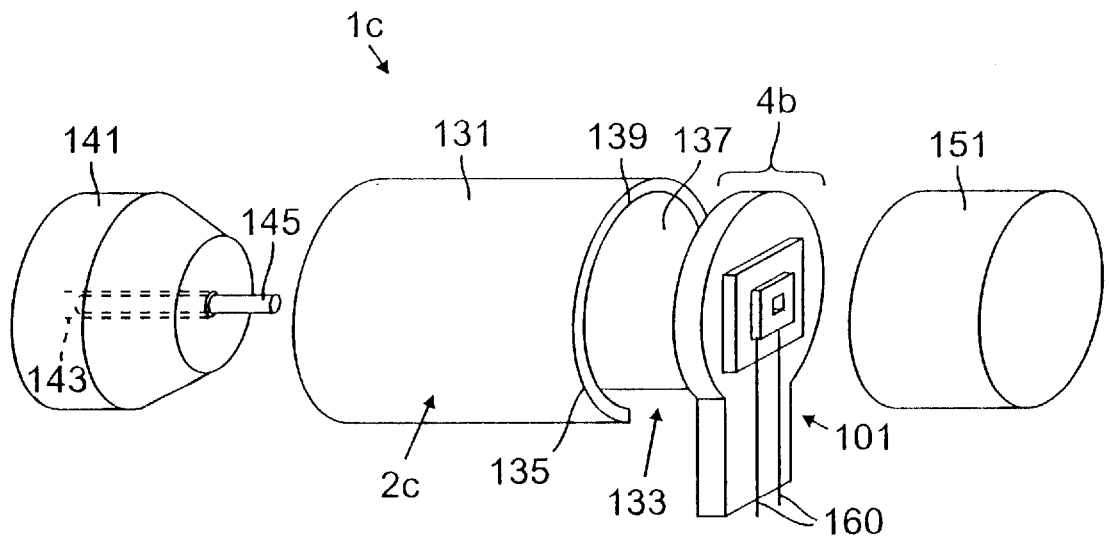
FIG. 9 is an exploded view of a second illustrative embodiment of an optical package assembly according to the present invention.

A third embodiment of a OPA 1c for a reflective optical device is shown in an exploded view in FIG. 9. The OPA 1c includes an OP 2c and an OSA 4[<m]ditb. In the OPA 1a previously described, the OP 2a is a ferrule, and in the OPA 1b the OP 2b is a slotted ferrule. In the OPA 1c, the OP 2c is a slotted ferrule sleeve 131 and centering disk 101. The OP 2c receives the OSA 4b, which includes a packaging component 109 and a reflective device 121 shown in FIG. 10. Again, for the purposes of illustration, the reflective device 121 is assumed to be a reflective modulator on a modulator chip.

Figure 10:
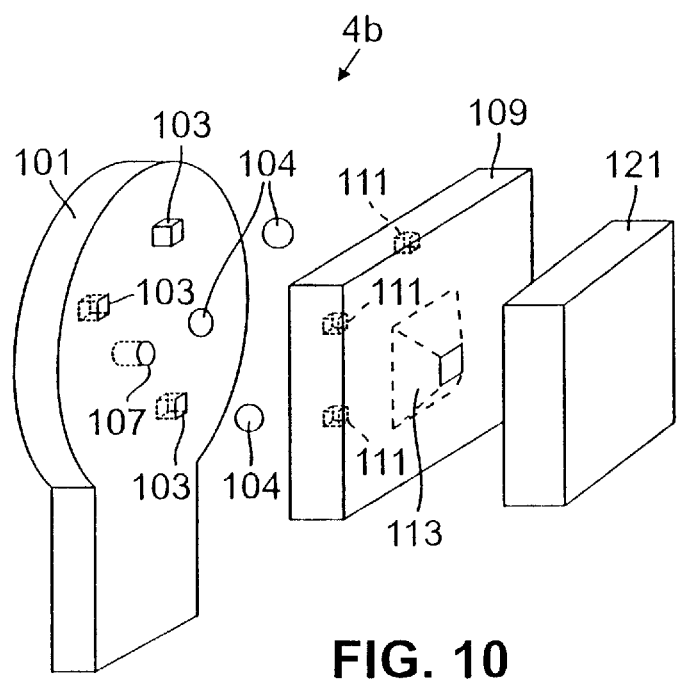
FIG. 10 is an exploded view of an exemplary optical package subassembly.

As illustrated in FIG. 10, the centering disk 101 and packaging component 109 preferably have complementary alignment/mating features 103 and 111, respectively, which facilitate mating and/or aligning the packaging component 109 with the centering disk 101. A variety of different types of alignment/mating features known to those skilled in the art can be used. For example, as shown in FIG. 10, alignment holes 103, 111 may be placed in the centering disk 101 and the packaging component 109, respectively, which holes receive alignment spheres 104.

The modulator chip 121 is mated to the packaging component 109. In preferred embodiments, the modulator chip 121 and the packaging component 109 are mated using the methods described above in conjunction with the OSA 4a for providing a hermetically sealed modulator. Alternatively, alignment spheres or other alignment/mating features known to those in the art can be employed for aligning and mating the packaging component to the modulator chip. It should be appreciated that such other alignment /mating features can be used in conjunction with the OSA 4a, as well.

The packaging component 109 has a fiber alignment region 113 identical to the fiber alignment region of the packaging component 9 of the OSA 4a. The modulator chip 121 includes a reflective modulator, and both the packaging component 109 and the modulator chip 121 include appropriate wire traces and the like for electrical connection as described above in conjunction with the OSA 4a. The centering disk 101 has a bore 107 aligned with the fiber alignment region 113.

With continuing reference to FIG. 9, the OSA 4b is received by the ferrule sleeve 131, which has a longitudinal slot 133 extending through a wall 135 to the interior 137 of the ferrule sleeve. The centering disk 101 includes a tab 105 for locating the centering disk within the ferrule sleeve 131 and preventing its rotation. The centering disk 101 is suitably thick to prevent any tilting of the OSA 4b within the ferrule sleeve 131.

A ferrule 141 is received by an end 138 of the ferrule sleeve 131. The ferrule 141 has a bore 143 running axially therethrough for receiving an optical fiber 145. The optical fiber 145 is received by the fiber alignment region 113 in the packaging component 109.

An end 139 of the ferrule sleeve 131 receives a plug 151. The OSA 4b is abutted against the plug 151. In other embodiments, other means for retaining the OSA 4b within the ferrule sleeve, such as stops formed within the sleeve, can be used.

Electrical leads 160 for placing the modulator in electrical connection with a controlled voltage source, not shown, project down through the slot 133 in the ferrule sleeve 131.

Figure 11:
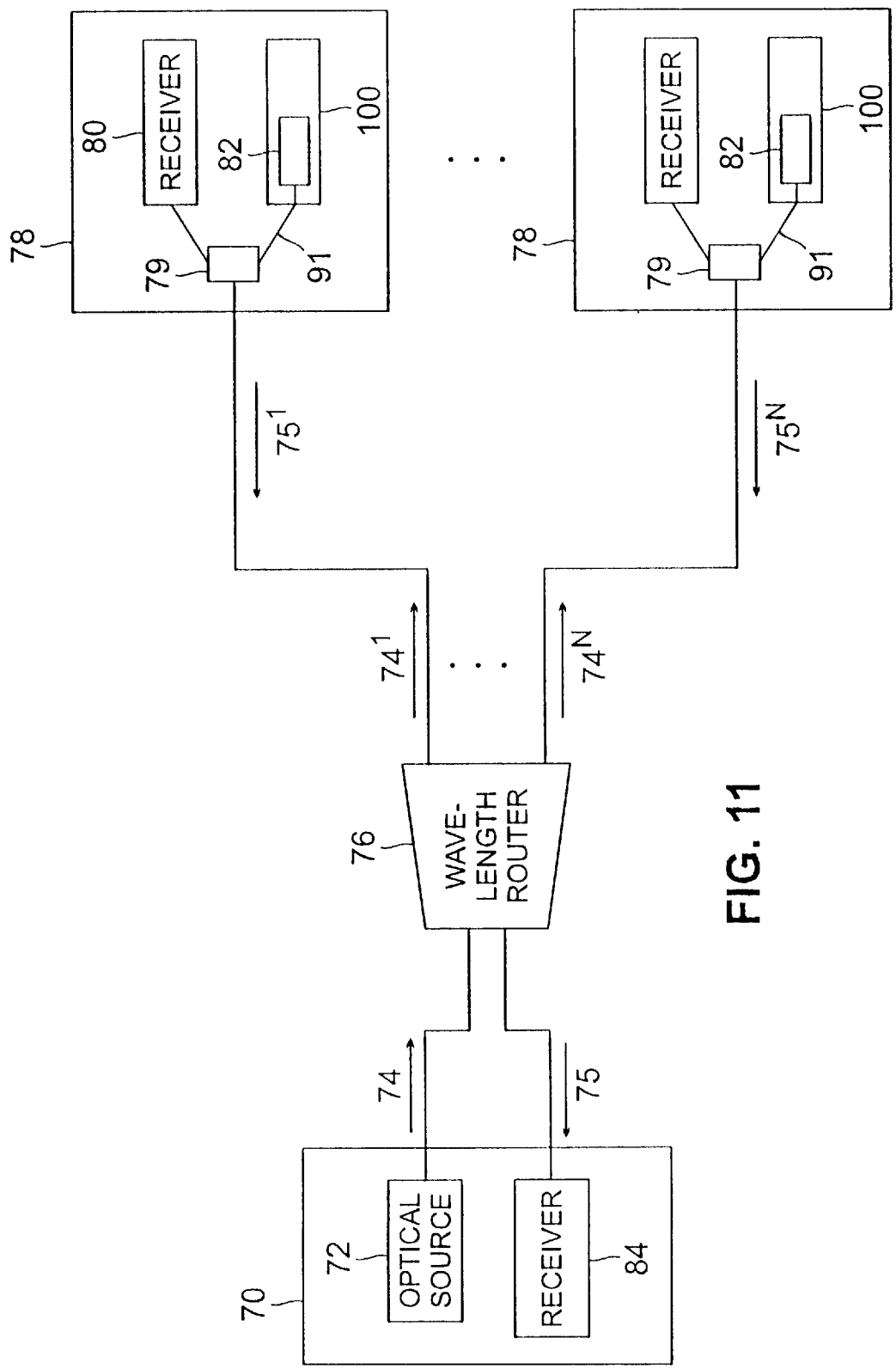
FIG. 11 is an exemplary embodiment of a passive optical network incorporating an optical packaging assembly according to the present invention.

Among other uses, the OPAs 1a, 1b and 1c according to the present invention can be used in conjunction with passive optical networks, such as the exemplary network shown in FIG. 11. The network includes a central office or head end terminal 70 having an active optical source 72, i.e., a transmitter, such as a multi-frequency laser or light-emitting diode. The central office sends information via an optical signal 74, in WDM format, to a plurality of optical network units (ONUs) 78 over an optical medium, such as optical fiber. Each ONU 78 receives such information on a prescribed wavelength. A wavelength routing device 76 demultiplexes the optical signal 74 into its spectral components $74^{1-N}$, and routes each of such spectral components to the appropriate ONU 78, i.e., the spectral component having a wavlength matching the prescribed wavelength of the ONU is routed thereto.

Each ONU includes a receiver 80, such as a photodetector, as well as a modulator 82 contained in an OPA 100 according to the present invention, such as the exemplary OPAs 1a, 1b and 1c. The ONU also includes a splitter 79, wherein a first portion of the power of the spectral component $74^i$ received by the ONU is routed to the receiver 80, and a second portion is routed to the modulator 82.

Information may be sent in packets to the ONU 78 via the spectral component $74^i$. Each packet contains a portion of information for processing by the ONU 78, as well as a portion of continuous-wave (CW) light or "optical chalkboard" upon which information can be encoded by the modulator. The optical signal is delivered to the OPA 100 over an input fiber 91. The optical energy reaching the receiver 80 is converted to an electrical signal, representative of the information contained in the packet, and routed to processing electronics, not shown. The modulator 82 encodes information on the CW portion, returning information-carrying spectral component $75^i$ to the fiber 91.

The information-carrying spectral components $75^{1-N}$ returned from the ONUs 78 are multiplexed by the wavelength routing device 76 into an optical signal 75, which is routed to a receiver 84 in the central office 70.

It will be appreciated that two passes through the splitter 79 results in relatively high insertion loss. For example, assuming splitter 79 is a 3 dB splitter, two passes through the splitter results in a 6 dB insertion loss, with an additional 2 dB loss for the splitter itself It would be desirable to reduce such losses.

Figure 12:
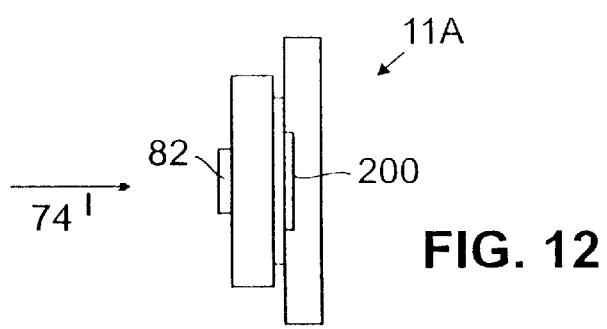
FIG. 12 is a further embodiment of an optical package subassembly according to the present invention.

In a further embodiment according the present invention, a modulator chip 11a incorporates a detector 200 "downstream" of the modulator, as shown in FIG. 12. Modulator reflectivity is kept low for a time period allowing the detector 200 to collect the optical signal transmitted through the modulator membrane. The modulator chip 11a can replace the modulator chip 11 in any of the exemplary embodiments of OSAs described herein. If the modulator chip 11a is incorporated into an OSA according to the present invention, a splitter, such as the splitter 79, is not required in a passive optical network. Signal losses in such networks are thereby significantly reduced.

Such combined or integrated modulator-detector chips suitable for use in conjunction with the present invention are disclosed in U.S. patent application Ser. No. 08/675,980 filed Jul. 5, 1996 and U.S. patent application Ser. No. 08/685,294 filed Jul. 23, 1996. It is within the capabilities of those skilled in the art to adapt those embodiments as necessary, i.e., routing of wire traces and the like, for use in the present invention.

Although a number of specific embodiments of this invention have been shown and described herein, it is to be understood that such embodiments are merely illustrative of the many possible specific arrangements that can be devised in application of the principles of this invention. Numerous and varied other arrangements can be devised in accordance with these principles by those of ordinary skill in the art without departing from the scope and the spirit of the invention.

We claim:

1. An optical packaging subassembly comprising:
    a packaging component having a first alignment/mating feature, and a fiber alignment region for receiving an optical fiber; and
    a reflective optical device attached to the packaging component, the reflective optical device having a second alignment/mating feature; wherein,
    the first alignment/mating feature and the second alignment/mating cooperate to align and mate the packaging component to the reflective optical device, and further wherein when so mated, the fiber alignment region optically aligns the optical fiber with the reflective optical device.

2. The optical packaging subassembly of claim 1, wherein the reflective optical device is a modulator disposed on a modulator chip.

3. The optical packaging subassembly of claim 1, wherein the alignment/mating feature of the packaging component is a metallized ring-shaped textured region and the alignment/mating feature of the modulator chip is a ring-shaped bump of metal, and further wherein bonding the metallized ring-shaped textured region to the ring-shaped bump of metal forms a hermetic seal around at least a portion of the reflective optical device.

4. The optical packaging subassembly of claim 1 wherein the reflective optical device is a modulator.

5. The optical packaging subassembly of claim 1 wherein the fiber alignment region is a bore in the packaging component.

6. The optical packaging subassembly of claim 5 wherein the bore is characterized by a taper, the angle of which taper is dictated by a crystallographic etch plane.

7. The optical packaging subassembly of claim 6, wherein the packaging component comprises a substrate region and a window layer, wherein the fiber alignment region receives the optical fiber at a surface of the substrate region and terminates at the window layer.

8. The optical packaging subassembly of claim 7 wherein the window layer is formed from high pressure steam oxide.

9. The optical packaging subassembly of claim 2 wherein the modulator chip has an electrical connection to wire bond pads on the packaging component so that electrical connection between off-chip electronics and the modulator can be made at the packaging component.

10. The optical packaging subassembly of claim 2 wherein the modulator comprises:
    a movable layer suspended over a fixed layer forming a gap therebetween, wherein the movable layer is comprised of at least one layer of material having a first refractive index that is approximately equal to the square root of a second refractive index of the fixed layer.

11. The optical packaging subassembly of claim 1, further comprising a centering disk attached to the packaging component, the centering disk having a bore therethrough for receiving the optical fiber and a circumferentially-located projection depending therefrom.

12. The optical packaging subassembly of claim 1, further comprising the optical fiber, wherein the optical fiber is connected to a passive optical network.

13. An optical package for use in integrating a reflective optical device into a fiber-optic system, the optical package comprising an arrangement for receiving the reflective optical device, wherein the arrangement is physically adapted to receive an optical fiber and to align the optical fiber with the reflective optical device.

14. The optical package of claim 13, wherein the arrangement comprises a fiber ferrule having a bore therethrough, wherein a first end of the fiber ferrule is in abutting relation with an optical packaging subassembly having a packaging component and the reflective optical device, the bore aligned to a fiber alignment region in the packaging component that optically aligns a received optical fiber to the reflective optical device.

15. The optical package of claim 14, further comprising a packaging base for receiving the packaging component, the reflective optical device and the fiber ferrule.

16. The optical package of claim 13, wherein the arrangement comprises a ferrule having a transverse slot formed therein for receiving the reflective optical device, the ferrule having a bore formed through a longitudinal symmetry axis thereof, wherein the bottom of the transverse slot has a sufficient radial depth so than an optical signal travelling through the optical fiber received by the bore is delivered to the reflective optical device.

17. The optical package of claim 13, wherein the arrangement comprises:

a cylindrical wall having a longitudinal slot therethrough defining a ferrule sleeve; and a centering disk received by the ferrule sleeve, the centering disk having
 a first circular portion suitably sized to be received within an inner circumference of the cylindrical wall, and further having a bore through its center, the bore aligning with a central longitudinal axis of the ferrule sleeve and having a size sufficient to allow an optical fiber to pass therethrough; and
 A second portion projecting beyond a circumference defined by the first circular portion and extending through the longitudinal slot of the ferrule sleeve thereby fixing the rotational orientation of the received centering disk.

18. The optical package of claim 17, further comprising a ferrule and a plug received by respective first and second ends of the ferrule sleeve.

19. The optical package of claim 17 further comprising:
a packaging component attached to the centering disk, the packaging component having a fiber alignment region for receiving the optical fiber, wherein the fiber alignment region is axially aligned with the bore in the centering disk;
a reflective optical device attached to the packaging component, wherein the fiber alignment region is optically aligned with the reflective optical device.

20. The optical package of claim 18, further comprising the optical fiber, wherein the optical fiber passes through the ferrule, the bore in the centering disk and is ultimately received by the fiber alignment region in the packaging component.

21. An optical package assembly for use in integrating a reflective optical device into a fiber-optic system, comprising:

a packaging component having a fiber alignment region for receiving an optical fiber;

a reflective optical device attached to the packaging component, wherein the fiber alignment region of the packaging component is in optical communication with the reflective optical device; and a receiving structure physically adapted to receive the packaging component, the optical device and the optical fiber, so that the optical fiber is placed in optical communication with the reflective optical device.

22. The optical package assembly of claim 21 wherein the receiving structure is a fiber ferrule having a bore therethrough, wherein a first end of the fiber ferrule is in abutting relation with the packaging component, and wherein the bore is aligned to the fiber alignment region in the packaging component.

23. The optical package assembly of claim 22 further comprising the optical fiber.

24. The optical package assembly of claim 22 wherein the reflective optical device is a modulator disposed on a modulator chip.

25. The optical package assembly of claim 24 wherein attaching the packaging component to the modulator hermetically seals the modulator.

26. The optical packaging assembly of claim 25 wherein the modulator comprises:
a movable layer suspended over a fixed layer forming a gap therebetween, wherein the movable layer is comprised of at least one layer of material having a first refractive index that is approximately equal to the square root of a second refractive index of the fixed layer.

27. The optical package assembly of claim 21 wherein the receiving structure comprises:

a ferrule having a transverse slot formed therein and having a bore formed through a longitudinal symmetry axis thereof, wherein, the packaging component and the optical device are received by the transverse slot and wherein an end of the bore receives the optical fiber, and further wherein a bottom of the slot has sufficient radial depth so that the optical fiber is in optical communication with the reflective optical device in the slot.

28. The optical package assembly of claim 21 wherein the receiving structure comprises a cylindrical wall having a longitudinal slot therethrough defining a ferrule sleeve; and the optical package assembly further comprises:

a centering disk attached to the packaging component, the centering disk having
 a first circular portion suitably sized to be received within an inner circumference of the cylindrical wall, and further having a bore through its center, the bore aligning with a central longitudinal axis of the ferrule sleeve and having a size sufficient to allow an optical fiber to pass therethrough; and
 A second portion projecting beyond a circumference defined by the first circular portion and extending through the longitudinal slot of the ferrule sleeve thereby fixing the rotational orientation of the received centering disk.

29. The optical package assembly of claim 28, further comprising a ferrule and a plug received by respective first and second ends of the ferrule sleeve.

30. The optical package assembly of claim 29 further comprising the optical fiber.

31. The optical package assembly of claim 28 wherein the reflective optical device is a modulator disposed on a modulator chip.

32. The optical package assembly of claim 31 wherein attaching the packaging component to the modulator hermetically seals the modulator.

33. The optical packaging assembly of claim 32 wherein the modulator comprises:

a movable layer suspended over a fixed layer forming a gap therebetween, wherein the movable layer is comprised of at least one layer of material having a first refractive index that is approximately equal to the square root of a second refractive index of the fixed layer.

34. A method for forming an optical packaging subassembly, comprising the steps of:

(A) forming a ring-shaped textured region on a first surface of a transparent, slow-etch layer disposed on a first surface of a substrate;

(B) metallizing the textured region;

(C) forming a ring-shaped metal ridge on a first surface of a chip having a modulator, wherein the modulator is located at the first surface of the chip within a perimeter defined by the ridge;

(D) aligning the chip to the substrate by aligning the textured region and the metal ridge; and (E) bonding the textured region to the metal ridge forming a hermetic seal around the modulator.

35. The method of claim 34 wherein step (A) further comprises forming a bore that extends from a second surface of the substrate, through the substrate and to the first surface of the substrate and terminates at a first surface of the slow-etch layer, the bore defining a fiber alignment and receiving region, and the termination of the bore at the slow-etch layer defining a window that is in optical communication with the modulator when the textured region is bonded to the metal ridge in step (E).

36. The method of claim 35 wherein step (A) further comprises forming a tapered bore, wherein the bore is larger at the second surface of the substrate than at the first surface of the substrate.

37. The method of claim 36 wherein step (A) further comprises forming the tapered bore using a crystallographic etch, so that the taper of the bore is determined by a crystallographic etch plane of the substrate.

* * * * *